United States Patent
Juan

(10) Patent No.: US 8,985,610 B2
(45) Date of Patent: Mar. 24, 2015

(54) SUSPENSION STRUCTURE AND DRIVING ASSEMBLY COMPRISING THE SAME

(71) Applicant: Gogoro Inc., George Town, KY (US)

(72) Inventor: Ching Juan, Taoyuan County (TW)

(73) Assignee: Gogoro Inc., Grand Cayman (KY)

( * ) Notice: Subject to any disclaimer, the term of this patent is extended or adjusted under 35 U.S.C. 154(b) by 0 days.

(21) Appl. No.: 14/200,205

(22) Filed: Mar. 7, 2014

(65) Prior Publication Data

US 2014/0251710 A1  Sep. 11, 2014

Related U.S. Application Data

(60) Provisional application No. 61/774,919, filed on Mar. 8, 2013.

(51) Int. Cl.
| | |
|---|---|
| B62K 25/02 | (2006.01) |
| B60G 11/16 | (2006.01) |
| B62K 25/28 | (2006.01) |
| B60G 3/18 | (2006.01) |

(52) U.S. Cl.
CPC .............. B60G 11/16 (2013.01); B62K 25/283 (2013.01); B60G 3/185 (2013.01); *B60G 2200/13* (2013.01); *B60G 2200/422* (2013.01); *B60G 2202/12* (2013.01); *B60G 2202/122* (2013.01); *B60G 2204/124* (2013.01)
USPC ........................................................ 280/285

(58) Field of Classification Search
CPC ............................ B62K 25/283; B62K 25/286
USPC .................................. 280/283, 284, 285, 286
See application file for complete search history.

(56) References Cited

U.S. PATENT DOCUMENTS

| | | | | |
|---|---|---|---|---|
| 4,058,181 | A * | 11/1977 | Buell | 180/227 |
| 4,951,791 | A * | 8/1990 | Belil Creixelli | 180/219 |
| 5,332,246 | A * | 7/1994 | Buell | 280/284 |
| 6,471,230 | B2 * | 10/2002 | Ellsworth et al. | 280/284 |
| 6,945,832 | B2 * | 9/2005 | Roycroft | 440/12.52 |
| 7,730,988 | B2 * | 6/2010 | Igarashi et al. | 180/227 |
| 8,740,234 | B2 * | 6/2014 | Sir | 280/124.179 |
| 2004/0140141 | A1 * | 7/2004 | Soatti | 180/226 |

FOREIGN PATENT DOCUMENTS

DE    102008011437 B4 *  8/2012

* cited by examiner

*Primary Examiner* — Kevin Hurley
(74) *Attorney, Agent, or Firm* — WPAT, P.C.; Anthony King

(57) ABSTRACT

A suspension structure utilized in a driving assembly of a vehicle with a first suspension arm, a second suspension arm, a third suspension arm and a shock absorber component is provided. The first suspension arm has a first fixed end and a first swing end opposite to the first fixed end. The second suspension arm has a second fixed end and a second swing end opposite to the second fixed end. The third suspension arm has a front swing end and a rear swing end opposite to the front swing end. The shock absorber component is disposed between the first suspension arm and the second suspension arm, and has two ends pivotally connected to the first suspension arm and the second suspension arm respectively. The shock absorber component is adapted to absorb an impact force by deforming while the impact force generated.

20 Claims, 5 Drawing Sheets

SUSPENSION STRUCTURE AND DRIVING ASSEMBLY COMPRISING THE SAME

BACKGROUND OF THE INVENTION

1. Field of the Invention

The present invention relates to a suspension structure, and more particularly, to a suspension structure which is disposed between a driving wheel and a power generating device of a vehicle. Therefore, the suspension structure is adapted to absorb an impact force generated by the environment while the vehicle driving.

2. Descriptions of the Related Art

In the time that mechanical technology has not been universal, the vehicle used to transport the goods was moved by human or animal drag. However, along with the development of technology, the movement for the vehicle is gradually changed into mechanical power.

Therefore, along with the advent of the mechanical technology age, the requirement for the vehicle is distinct from the previously age. For example, in the past, the vehicle is merely required if it can finish the transport operation during the working time. However, the vehicle is not only required to finish the transport operation during the working time, but also required to finish the transport operation with lowest power wastage or the most effective way nowadays.

What is more, in addition to the above requirements, it is also a big challenge about how to maintain the stability while driving, so that even if the vehicle drives on the bumpy roads, the goods and the passengers placed on the vehicle will have no affected. Along with the aforementioned demand, the suspension structure used for absorbing the impact force to maintain the stability of the vehicle while driving is started with vigorous development.

The suspension structure used in the vehicle such as car or scooter nowadays, are disposed between a power generating device of the vehicle and a driving wheel. Thus, while the vehicle driving and the driving wheel is driven with a transmission element (e.g.: a belt) by the power generating device (e.g.: an engine) disposed on the vehicle, if the driving wheel is received an impact force by the bumpy road, then the impact force will be absorbed by the suspension structure. That is, the vehicle will be able to provide a comfortable traveling quality for the goods or the passengers by the arrangement of the suspension structure.

However, since the suspension structure is able to absorb the kinetic energy of the impact force by transforming the kinetic energy to the potential energy, the potential energy will change the relative positions of the elements of the suspension structure. Therefore, the distance between the power generating device of the vehicle and the driving wheel will be changed during the process of absorbing the impact force, and the transmission elements (i.e.: the belt) will become tight or loose, thereby seriously affecting the life of the transmission elements, and causes the low power transmission efficiency between the power generating device and the driving wheel.

Accordingly, an urgent need exists in the art to provide a suspension structure and a driving assembly comprising the same which are able to absorb the impact force generated by the environment, and are able to minimize the changes in the distance between the power generating device and the driving wheel.

SUMMARY OF THE INVENTION

An objective of the present invention is to provide a suspension structure disposed between a power generating device of a vehicle and a driving wheel, wherein the changes in the distance between the power generating device and the driving wheel are able to be minimized by the arrangement of the suspension structure. Therefore, the tension of a transmission element disposed between the power generating device and the driving wheel will keep a constant value, or change within a range of values.

To achieve the aforesaid objective, a suspension structure with a first suspension arm, a second suspension arm, a third suspension arm and a shock absorber component is provided. The first suspension arm has a first fixed end and a first swing end opposite to the first fixed end. The second suspension arm has a second fixed end and a second swing end opposite to the second fixed end. The third suspension arm has a front swing end and a rear swing end opposite to the front swing end. The shock absorber component is disposed between the first suspension arm and the second suspension arm, and has two ends pivotally connected to the first suspension arm and the second suspension arm respectively. The shock absorber component is adapted to absorb an impact force by deforming while the impact force generated.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
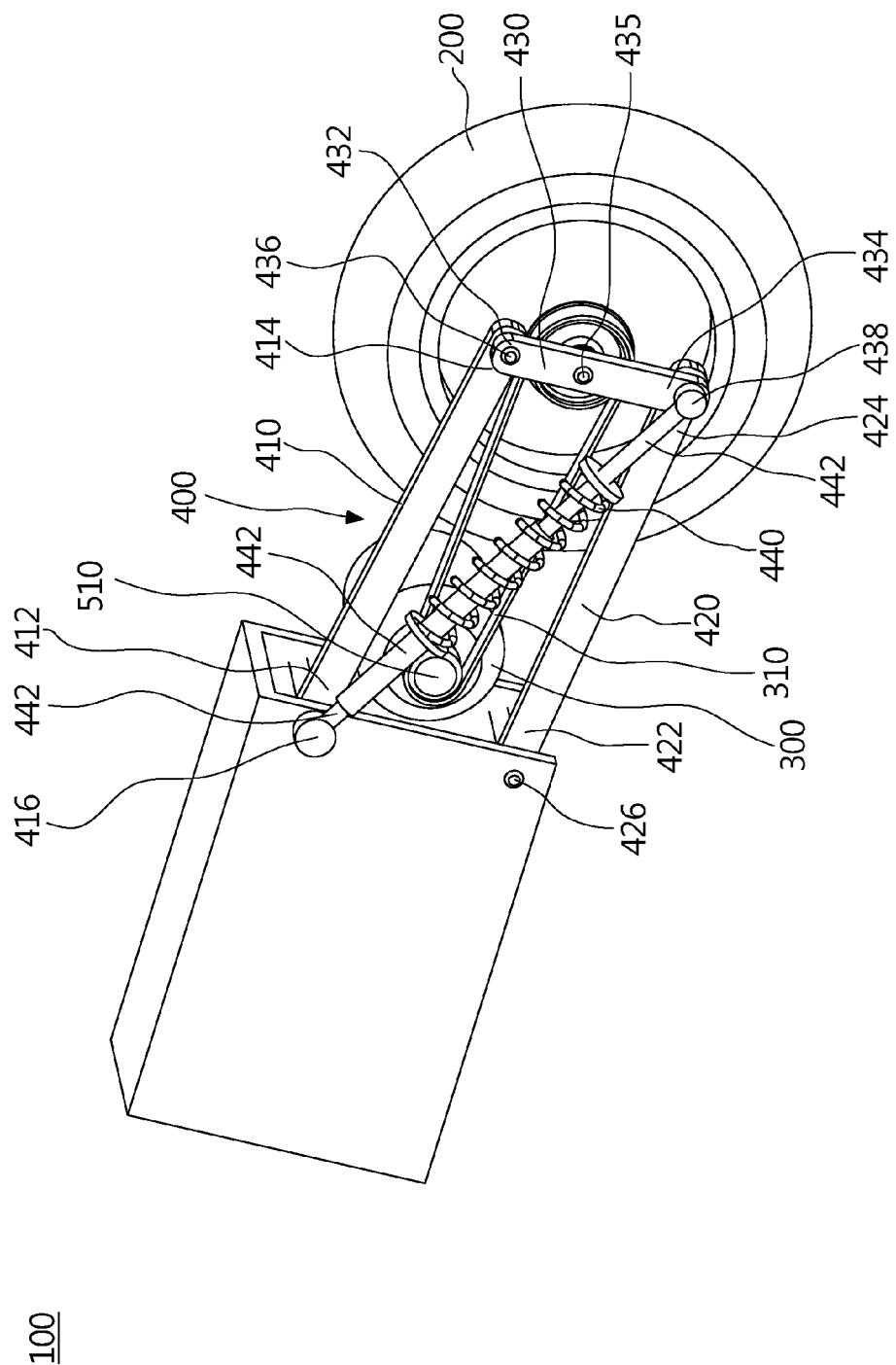
FIG. 1 is a schematic view illustrating a driving assembly with a suspension structure of the present invention.
Figure 2:
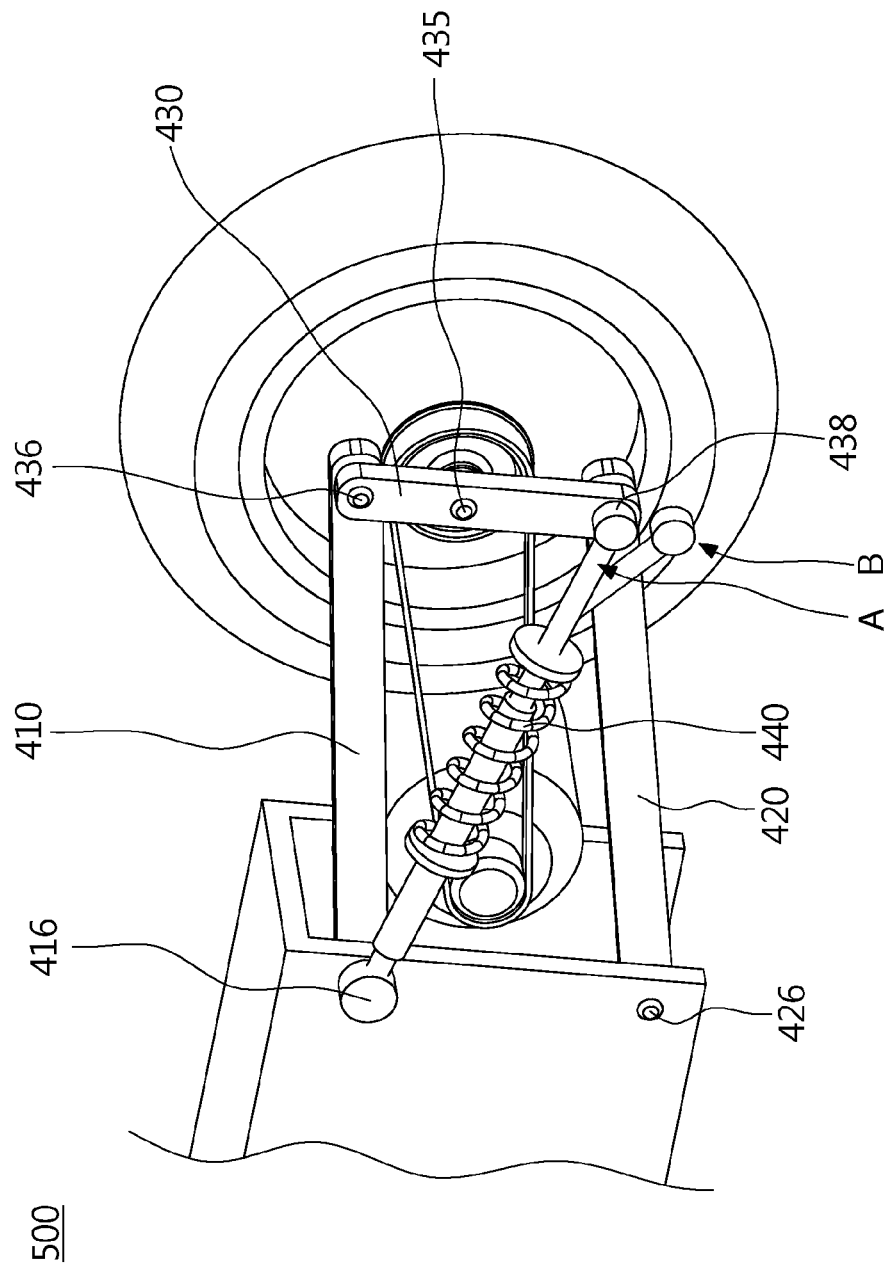
FIG. 2 is a schematic view illustrating a driving assembly of the present invention driving on the road.

With reference to both FIG. 1 and FIG. 2, a driving assembly 100 of the present invention utilized in a vehicle 500 is provided, and the driving assembly 100 is adapted to provide assistance to the vehicle 500 driving on the road.

As shown in FIG. 1, the driving assembly 100 comprises a driving wheel 200, a power generating device 300 and a suspension structure 400. The power generating device 300 is disposed on a driving position 510 of the vehicle 500 and connected to the driving wheel 200 by a transmission element 310 to provide power to the driving wheel 200.

It is noted that the driving position 510 where the power generating device 300 disposed, is fixed on the vehicle 500. In other words, no matter what kind of road the vehicle 500 drives on, the power generating device 300 is always disposed on the same position.

Figure 3:
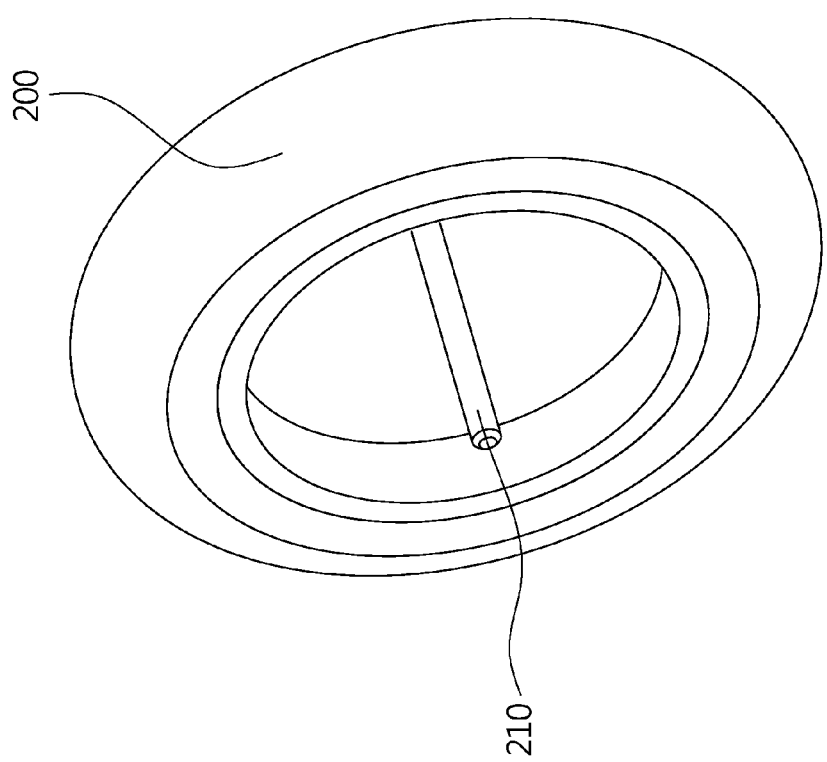
FIG. 3 is a schematic view illustrating the driving wheel of the driving assembly of the present invention.

The suspension structure 400 comprises a first suspension arm 410, a second suspension arm 420, a third suspension arm 430 and a shock absorber component 440, thereby the suspension structure 400 could better stable suspension for the vehicle 500 than prior art. In addition, with reference to FIG. 3, the driving wheel 200 comprises a rotating axis 210 on which the third suspension arm 430 is pivoted.

Hereinbelow, the arrangement between the first suspension arm 410, the second suspension arm 420, the third suspension arm 430 and the shock absorber component 440 of the suspension structure 400 of this embodiment will be further introduced.

As shown in FIG. 1, the first suspension arm 410 has a first fixed end 412 and a first swing end 414 opposite to the first fixed end 412, wherein the first fixed end 412 is pivoted to the vehicle 500 at a first pivot point 416. The second suspension arm 420 has a second fixed end 422 and a second swing end 424 opposite to the second fixed end 422, wherein the second fixed end 422 is pivoted to the vehicle 500 at a second pivot point 426. The third suspension arm 430 has a front swing end 432 and a rear swing end 434 opposite to the front swing end 432, wherein the front swing end 432 is pivotally connected to the first swing end 414 of the first suspension arm 410 at a first swing point 436, and the rear swing end 434 is pivotally connected to the second swing end 424 of the second suspension arm 420 at a second swing point 438. The shock absorber component 440 is disposed between the first suspension arm 410 and the second suspension arm 420, and has two ends 442 pivotally connected to the first suspension arm 410 and the second suspension arm 420 respectively.

Through the above arrangement, the first suspension arm 410, the second suspension arm 420, the third suspension arm 430 and the vehicle 500 are generally presented a four-bar linkage structure. Besides, as the shock absorber component 440 is disposed between the first suspension arm 410 and the second suspension arm 420, when the vehicle 500 is driving, the suspension structure 400 is adapted to absorb an impact force generated by the environment by transforming the kinetic energy of the impact force to the potential energy, wherein the potential energy will cause changes in the relative positions of the first suspension arm 410, the second suspension arm 420, the third suspension arm 430 and the shock absorber component 440. On the other hand, as the suspension structure 400 is generally presented a four-bar linkage structure, this also benefits to limit the relative position between the first suspension arm 410, the second suspension arm 420, the third suspension arm 430 and the shock absorber component 440. The suspension structure 400 is therefore to absorb the impact force generated by the environment with the minimum displacement, and maintain the stability of the vehicles 500.

As shown in FIG. 1, the third suspension arm 430 further comprises a wheel axle point 435 disposed between the front swing end 432 and the rear swing end 434. Therefore, when the rotating axis 210 of the driving wheel 200 is disposed on the wheel axle point 435, the driving wheel 200 is disposed on a position between the front swing end 432 and the rear swing end 434 of the third suspension arm 430. As such, the distance between the driving position 510 and the rotating axis 210 is equal to the distance d between the driving position 510 and the wheel axle point 435 of the third suspension arm 430.

Therefore, when the vehicle 500 with goods or passengers is driving on a flat road, the interaction between the first suspension arm 410, the second suspension arm 420, the third suspension arm 430 and the shock absorber component 440 will make the suspension structure 400 in a stable force mode. As a result, the weights of the vehicle 500 and the goods are uniform downward. The flat road will cause the driving wheel 200 with a force uniform upward. That is, when the vehicle 500 drives on the flat road, the suspension structure 400 will has the illustration as shown in FIG. 2. In this moment, as the driving wheel 200 is with a force uniform upward, the shock absorber component 440 is in a compressed mode. The position where the shock absorber component 440 is pivoted to the second swing end 424 of the second suspension arm 420 will slightly move upward as shown by arrow A. In such a case, the suspension structure 400 is not only used for absorb the impact force generated by the environment, but the wheel axle point 435 of the third suspension arm 430 also keeps a constant distance d to the driving position 510. As the wheel axle point 435 of the third suspension arm 430 keeps a constant distance d to the driving position 510, the tension of the transmission element 310 also keeps a constant value.

Therefore, when the vehicle 500 drives on a flat road, the suspension structure 400 will prolong the life of the transmission element 310, and ensure the stability and comfort of the vehicle 500 while driving.

On the other hand, when the vehicle 500 with goods or passengers drives on a bumpy road, since the bumpy road will make the driving wheel 200 in an impact state or a non-impact state continuously and irregularly, the suspension structure 400 is accordingly compressed or relaxed. The position where the shock absorber component 440 is pivoted to the second swing end 424 of the second suspension arm 420 will not be in an equilibrium position, but be moved upward or downward. In detail, as shown in FIG. 2, the position where the shock absorber component 440 is pivoted the second swing end 424 of the second suspension arm 420 will be moved between the arrow A and the arrow B. The suspension structure 400 is therefore swinging upward or downward, and changing the position corresponding to the bumpy road.

However, even though the vehicle 500 with goods or passengers drives on the bumpy road, and therefore cause the changes in the relative positions between the first suspension arm 410, the second suspension arm 420, the third suspension arm 430 and the shock absorber component 440 of the suspension structure 400, the distance d between the wheel axle point 435 of the third suspension arm 430 and the driving position 510 still changes within a range of values. Since the distance d between the wheel axle point 435 of the third suspension arm 430 and the driving position 510 changes within a range of values, the tension of the transmission element 310 changes within a range of values. Meanwhile, the change in the tension of the transmission element 310 is minimized.

As a result, although the tension of the transmission element 310 will changes irregularly when the vehicles 500 drives on the bumpy road with the suspension structure 400, the change in the tension of the transmission element 310 is minimized effectively by the distinguished arrangement of the first suspension arm 410, the second suspension arm 420, the third suspension arm 430 and the shock absorber component 440. The above distinguished arrangement also prolongs life of the transmission element 310, and ensures the stability and comfort of the vehicles 500 while driving.

After indicating the distinguished arrangement of the first suspension arm 410, the second suspension arm 420, the third suspension arm 430 and the shock absorber component 440, the effect of the tension of the transmission element 310 and the stability and comfort of the vehicles 500, the followings are going to discuss the situation about the changes of the distance d between the wheel axle point 435 of the third suspension arm 430 and the driving position 510.

First, if we define the position where the wheel axle point 435 disposed is moved within an allowable moving area while the driving wheel 200 is impacted but is not impacted by the impact force generated by the environment, and the highest point of the allowable moving area is defined by the arrow A, and the lowest point of the allowable moving area is defined by the arrow B, then we can therefore define that the distance d between the wheel axle point 435 and the driving position 510 is changed within the range of values D-D', wherein the value of D' is larger than the value of D.

As a result, with properly adjusting the relative arm lengths of the first suspension arm 410, the second suspension arm 420 and the third suspension arm 430, the change in the value of the distance d between the wheel axle point 435 and the driving position 510 is varied correspondingly.

For example, when the relative arm lengths of the first suspension arm 410, the second suspension arm 420 and the third suspension arm 430 are adjusted to cause the driving wheel 200 to be suspended (i.e. the driving wheel 200 is not impacted by the impact force generated by the environment, and the shock absorber component 440 is disposed on the arrow B), the distance d between the wheel axle point 435 and the driving position 510 is in the value of D (i.e. the distance d is minimized). Also, when the driving wheel 200 is impacted by the impact force generated by the environment, and the shock absorber component 440 is disposed on the highest point of the allowable moving area (i.e. the arrow A), the distance d between the wheel axle point 435 and the driving position 510 is in the value of D' (i.e. the distance d is maximized). As a result, in this first embodiment, t the tension of the transmission element 310 is changed from loose to tight smoothly.

Further, if the relative arm lengths of the first suspension arm 410, the second suspension arm 420 and the third suspension arm 430 are similarly adjusted to cause the driving wheel 200 to be suspended (i.e. the driving wheel 200 is not impacted by the impact force generated by the environment, and the shock absorber component 440 is disposed on the arrow B), the distance d between the wheel axle point 435 and the driving position 510 is in the value of D' (i.e. the distance d is maximized). Also, when the driving wheel 200 is impacted by the impact force generated by the environment, and the shock absorber component 440 is disposed on the highest point of the allowable moving area (i.e. the arrow A), the distance d between the wheel axle point 435 and the driving position 510 is in the value of D (i.e. the distance d is minimized). As a result, in this second embodiment, the tension of the transmission element 310 is changed from tight to loose smoothly, contrary to the first embodiment.

In another possible embodiment, the relative arm lengths of the first suspension arm 410, the second suspension arm 420 and the third suspension arm 430, are properly adjusted to cause the distance d between the wheel axle point 435 and the driving position 510 is in the value of D' (i.e. the distance d is maximized) while the shock absorber component 440 is disposed between the highest point (i.e. the arrow A) and the lowest point (i.e. the arrow B) of the allowable moving area. In addition, cause the distance d between the wheel axle point 435 and the driving position 510 to be in the value of D (i.e. the distance d is minimized) while the shock absorber component 440 is disposed on the highest point (i.e. the arrow A) or the lowest point (i.e. the arrow B) of the allowable moving area. As a result, in this third embodiment, the tension of the transmission element 310 is changed from loose to tight to loose.

The above statements for the change in the value of the distance d between the wheel axle point 435 and the driving position 510 describe the tiny changes in the tension of the transmission element 310 in different situations. However, it is noted that even though the tension of the transmission element 310 is changed in the above situations, the change in the value is still far less than that in the prior art. Thus, the arrangement of the suspension structure 400 will prolong life of the transmission element 310.

In order to make the tension of the transmission element 310 in a constant value, or to make the tension of the transmission element 310 change within a range of values, the driving position 510 where the power generating device 300 is mounted is preferred but not limited to be disposed between the first pivot point 416 and the second pivot point 426. For example, the driving position 510 is disposed on the connecting line of the first pivot point 416 and the second pivot point 426, or the driving position 510 is disposed on the area between the first pivot point 416 and the second pivot point 426.

Figure 5:
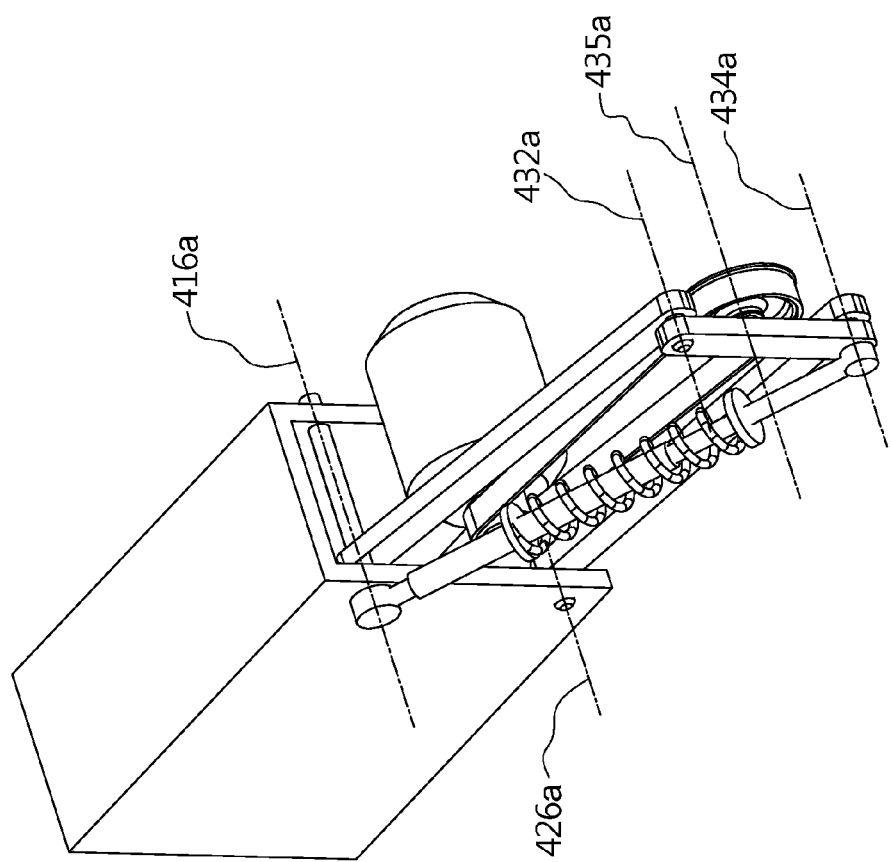
FIG. 5 is a schematic view illustrating a first axial direction, a second axial direction and a third axial direction of the suspension structure of the present invention.

In addition, as shown in FIG. 5, the wheel axle point 435 of the third suspension arm 430, the front swing end 432 and the rear swing end 434 may be disposed such that their axial directions 435a, 432a and 434a are parallel to each other. In a related trial, such arrangement has the benefits of minimizing the distance d between the wheel axle point 435 of the third suspension arm 430 and the driving position 510, and makes sure that the first swing point 436 where the front swing end 432 is pivoted to the first swing end 414 of the first suspension arm 410, and the second swing point 438 where the rear swing end 434 is pivoted to the second swing end 424 of the second suspension arm 420 are both with great structural strength.

Figure 4:
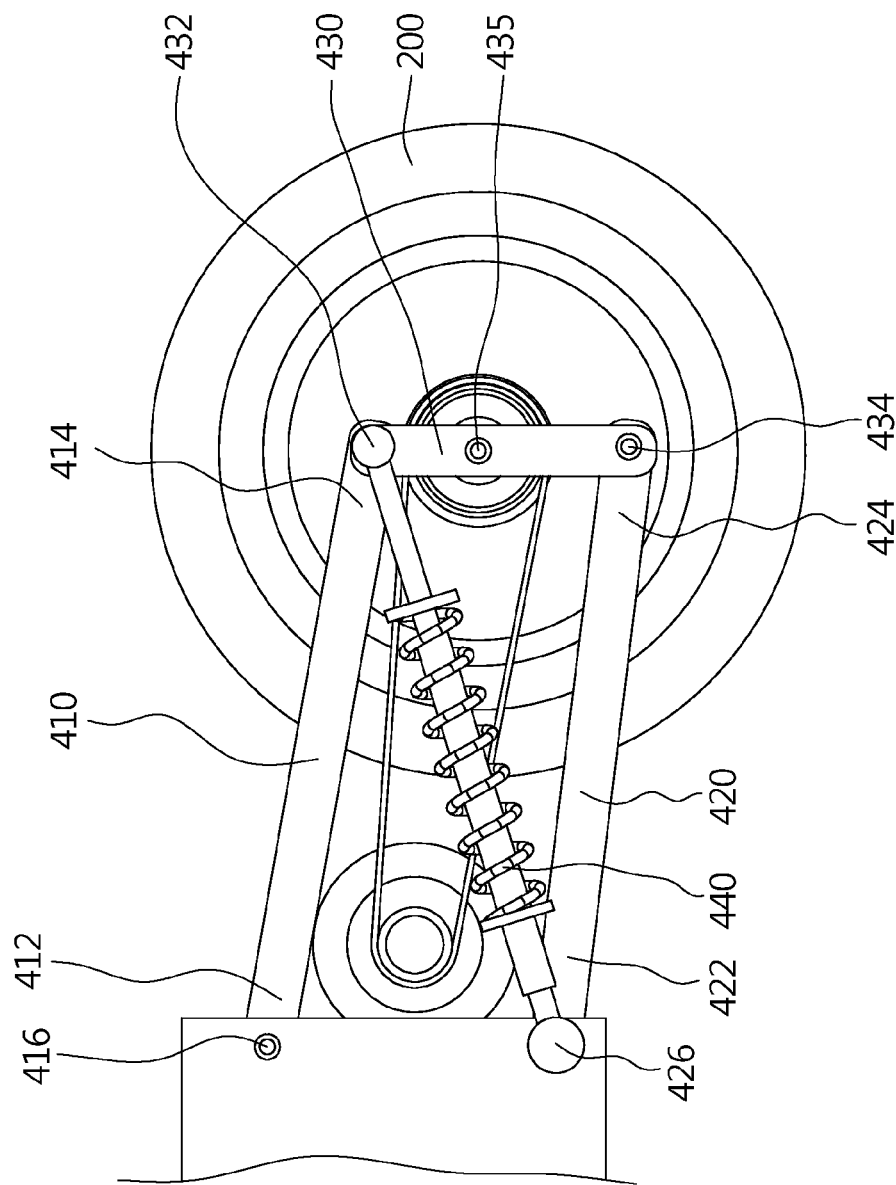
FIG. 4 is a schematic view illustrating the other embodiment of the suspension structure of the present invention.

With reference to FIG. 1 again, although the embodiment merely discloses that the two ends 442 of the shock absorber component 440 are pivotally connected to the first fixed end 412 of the first suspension arm 410 and the second swing end 424 of the second suspension arm 420 respectively. However, those of ordinary skill in the art can also appreciate that in the case that the two ends 442 of the shock absorber component 440 are pivotally connected to the first swing end 414 of the first suspension arm 410 and the second fixed end 422 of the second suspension arm 420 respectively (see FIG. 4), the suspension structure 400 can still reach the preferable effects.

Further, with reference to FIG. 5 again, the first pivot point 416 and the second pivot point 426 may be disposed such that their axial directions 416a and 426a are parallel or non-parallel. This also assists to make the wheel axle point 210 of the driving wheel 200 keep a constant distance d to the driving position 510 while the vehicle 500 driving, or make the distance d between the wheel axle point 210 of the driving wheel 200 and the driving position 510 merely change within a range of values while the vehicle 500 driving.

Although the vehicle 500 is illustrated as a two-wheel vehicle in the above-mentioned embodiments, the vehicle 500 may also be a three-wheel vehicle or a four-wheel vehicle. In addition, the power generating device 300 is preferred but not limited to a motor or an engine, and the transmission element 310 is preferred but not limited to a belt or a chain according to the present invention.

As mentioned above, the suspension structure 400 of the driving assembly 100 is adapted to effectively absorb the impact force generated by the environment and provide comfortable traveling quality for the goods and the passengers while the vehicle 500 driving. Furthermore, by the arrangement of the suspension structure 400, the first suspension arm 410, the second suspension arm 420, the third suspension arm 430 and the shock absorber component 440, the wheel axle point 210 of the driving wheel 200 is able to keep a constant distance to the driving position 510, or make the distance between the wheel axle point 210 of the driving wheel 200 and the driving position 510 merely change within a range of values. Therefore, the life of the transmission element 310 is extended, and the power conversion from the power generation device 300 to the driving wheel 200 is optimized.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A suspension structure utilized in a driving assembly of a vehicle, and adapted to pivotally connected with a driving wheel of the driving assembly, wherein the driving wheel comprises a rotating axis, the suspension structure comprising:
   a first suspension arm, having a first fixed end and a first swing end opposite to the first fixed end, wherein the first fixed end is pivoted to the vehicle at a first pivot point;
   a second suspension arm, having a second fixed end and a second swing end opposite to the second fixed end, wherein the second fixed end is pivoted to the vehicle at a second pivot point;
   a third suspension arm, having a front swing end and a rear swing end opposite to the front swing end, the front swing end being pivotally connected to the first swing end of the first suspension arm at a first swing point, and the rear swing end being pivotally connected to the second swing end of the second suspension arm at a second swing point; and
   a shock absorber component, disposed between the first suspension arm and the second suspension arm and having two ends pivotally connected to the first suspension arm and the second suspension arm respectively,
   wherein the two ends of the shock absorber component are pivotally connected to the first fixed end of the first suspension arm and the second swing end of the second suspension arm respectively, or the two ends of the shock absorber component are pivotally connected to the first swing end of the first suspension arm and the second fixed end of the second suspension arm respectively.

2. The suspension structure of claim 1, wherein the arrangement between the first suspension arm and the second suspension arm is in a non-parallel relationship.

3. The suspension structure of claim 1, wherein the third suspension arm further comprises a wheel axle point disposed between the front swing end and the rear swing end, and the rotating axis of the driving wheel is disposed on the wheel axle point.

4. The suspension structure of claim 3, wherein the driving wheel is connected to a power generating device by a transmission element.

5. The suspension structure of claim 4, wherein the power generating device is disposed on a driving position of the vehicle.

6. The suspension structure of claim 5, wherein the wheel axle point keeps a constant distance to the driving position while the vehicle driving.

7. The suspension structure of claim 5, wherein the driving position is disposed between the first pivot point and the second pivot point.

8. The suspension structure of claim 1, wherein the two ends of the shock absorber component are pivotally connected to the first fixed end of the first suspension arm and the second swing end of the second suspension arm respectively.

9. The suspension structure of claim 1, wherein the two ends of the shock absorber component are pivotally connected to the first swing end of the first suspension arm and the second fixed end of the second suspension arm respectively.

10. The suspension structure of claim 1, wherein the vehicle is a two-wheel vehicle, a three-wheel vehicle or a four-wheel vehicle.

11. A driving assembly utilized in a vehicle, comprising:
    a driving wheel, comprising a rotating axis;
    a power generating device, disposed on a driving position of the vehicle and connected to the driving wheel by a transmission element for providing a power to the driving wheel; and
    a suspension structure, adapted to pivotally connected with the driving wheel, comprising:
      a first suspension arm, having a first fixed end and a first swing end opposite to the first fixed end, wherein the first fixed end is pivoted to the vehicle at a first pivot point;
      a second suspension arm, having a second fixed end and a second swing end opposite to the second fixed end, wherein the second fixed end is pivoted to the vehicle at a second pivot point;
      a third suspension arm, having a front swing end and a rear swing end opposite to the front swing end, the front swing end is pivotally connected to the first swing end of the first suspension arm at a first swing point and the rear swing end is pivotally connected to the second swing end of the second suspension arm at a second swing point; and
      a shock absorber component, disposed between the first suspension arm and the second suspension arm and having two ends pivotally connected to the first suspension arm and the second suspension arm respectively,
      wherein the two ends of the shock absorber component are pivotally connected to the first fixed end of the first suspension arm and the second swing end of the second suspension arm respectively, or the two ends of the shock absorber component are pivotally connected to the first swing end of the first suspension arm and the second fixed end of the second suspension arm respectively.

12. The driving assembly of claim 11, wherein the third suspension arm further comprises a wheel axle point disposed between the front swing end and the rear swing end, and the rotating axis of the driving wheel is disposed on the wheel axle point.

13. The driving assembly of claim 12, wherein the wheel axle point keeps a constant distance to the driving position while the vehicle driving.

14. The driving assembly of claim 12, wherein the distance between the wheel axle point and the driving position changes within a range of values while the vehicle driving.

15. The driving assembly of claim 11, wherein the driving position is disposed between the first pivot point and the second pivot point.

16. The driving assembly of claim 11, wherein the two ends of the shock absorber component are pivotally connected to the first fixed end of the first suspension arm and the second swing end of the second suspension arm respectively.

17. The driving assembly of claim 11, wherein the two ends of the shock absorber component are pivotally connected to the first swing end of the first suspension arm and the second fixed end of the second suspension arm respectively.

18. The driving assembly of claim 11, wherein the arrangement between the first suspension arm and the second suspension arm is in a non-parallel relationship.

19. The driving assembly of claim 11, wherein the vehicle is a two-wheel vehicle, a three-wheel vehicle or a four-wheel vehicle.

20. The driving assembly of claim 11, wherein the power generating device is a motor or an engine, and the transmission element is a belt or a chain.

* * * * *